US012762889B2

(12) United States Patent
Lee

(10) Patent No.: US 12,762,889 B2
(45) Date of Patent: Oct. 13, 2026

(54) FACE DETECTION METHOD USING VOICE

(71) Applicant: KAKAOBANK CORP., Seongnam-si (KR)

(72) Inventor: Dong Yeoul Lee, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 340 days.

(21) Appl. No.: 18/030,360

(22) PCT Filed: Oct. 5, 2021

(86) PCT No.: PCT/KR2021/013623
§ 371 (c)(1),
(2) Date: Apr. 5, 2023

(87) PCT Pub. No.: WO2022/075702
PCT Pub. Date: Apr. 14, 2022

(65) Prior Publication Data
US 2023/0377367 A1 Nov. 23, 2023

(30) Foreign Application Priority Data
Oct. 6, 2020 (KR) ........................ 10-2020-0128775

(51) Int. Cl.
*G06V 40/16* (2022.01)
*G06V 20/40* (2022.01)
(Continued)

(52) U.S. Cl.
CPC ............ *G06V 40/166* (2022.01); *G06V 20/46* (2022.01); *G06V 40/171* (2022.01); *G06V 40/70* (2022.01); *G10L 25/57* (2013.01)

(58) Field of Classification Search
None
See application file for complete search history.

(56) References Cited

U.S. PATENT DOCUMENTS 8,457,367 B1 * 6/2013 Sipe ........................ G06F 21/32 382/118
10,210,860 B1 * 2/2019 Ward ..................... G06N 3/044
(Continued)

FOREIGN PATENT DOCUMENTS

CN 110648667 A * 1/2020 ......... G06K 9/00228
CN 111415677 B * 12/2020
(Continued)

OTHER PUBLICATIONS

Office Action dated Apr. 10, 2023, issued in counterpart KR Application No. 10-2020-0128775, with English translation 10 pages).
(Continued)

*Primary Examiner* — Fan Zhang
(74) *Attorney, Agent, or Firm* — WHDA, LLP

(57) ABSTRACT

Face detection methods using voice are provided. The face detection method comprises the: receiving video data and voice data from a user terminal; deriving a first interval related to a predetermined message based on the received voice data; configuring a second interval based on the derived first interval; extracting a part of the video data corresponding to the second interval; deriving at least one video frame which satisfies a predetermined criterion from the extracted video data; and detecting a facial image included in each of the at least one derived video frame.

11 Claims, 8 Drawing Sheets

(51) Int. Cl.

| | |
|---|---|
| ***G06V 40/70*** | (2022.01) |
| ***G10L 25/57*** | (2013.01) |

(56) References Cited

U.S. PATENT DOCUMENTS

| | | | | |
|---|---|---|---|---|
| 2012/0136823 | A1 | 5/2012 | Konuma et al. | |
| 2014/0240507 | A1* | 8/2014 | Hsu | H04N 7/185 348/143 |
| 2020/0097643 | A1* | 3/2020 | Uzun | G06V 40/40 |
| 2020/0358983 | A1* | 11/2020 | Astarabadi | H04N 7/157 |

FOREIGN PATENT DOCUMENTS

| | | | | |
|---|---|---|---|---|
| KR | 10-2010-0116124 A | | 10/2010 | |
| KR | 10-2015-0044128 | | 4/2015 | |
| KR | 10-2017-0001416 | | 1/2017 | |
| KR | 101842612 B1 | | 3/2018 | |
| WO | WO-2011145249 A1 | * | 11/2011 | G06N 5/04 |
| WO | WO-2019033129 A2 | * | 2/2019 | G06F 21/32 |

OTHER PUBLICATIONS

Office Action dated Jan. 24, 2025, issued in counterpart KR Application No. 10-2023-0085920, with English translation (8 pages).

International Search Report dated Jan. 10, 2022, issued in counterpart International Application No. PCT/KR2021/013623 (4 pages).

Office Action dated Jun. 10, 2022, issued in counterpart KR Application No. 10-2020-0128775, with English translation (12 pages).

Office Action dated Dec. 27, 2022, issued in counterpart KR Application No. 10-2020-0128775, with English translation (10 pages).

Office Action dated Jul. 28, 2025, issued in counterpart Singapore Patent Application No. 11202302610V (2 pages).

* cited by examiner

[FIG. 1]
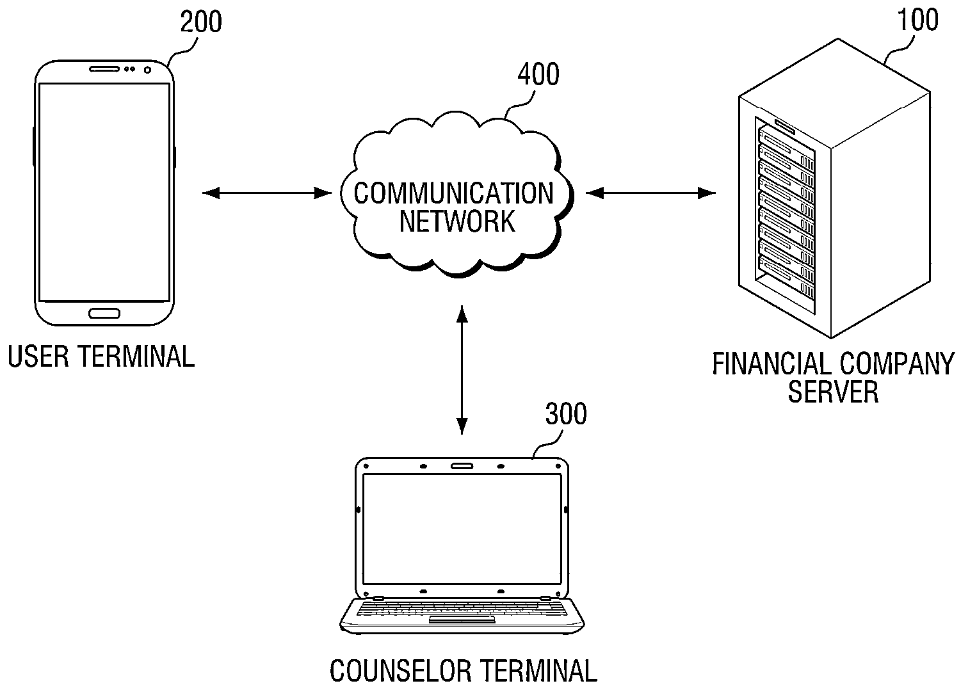

[FIG. 2]
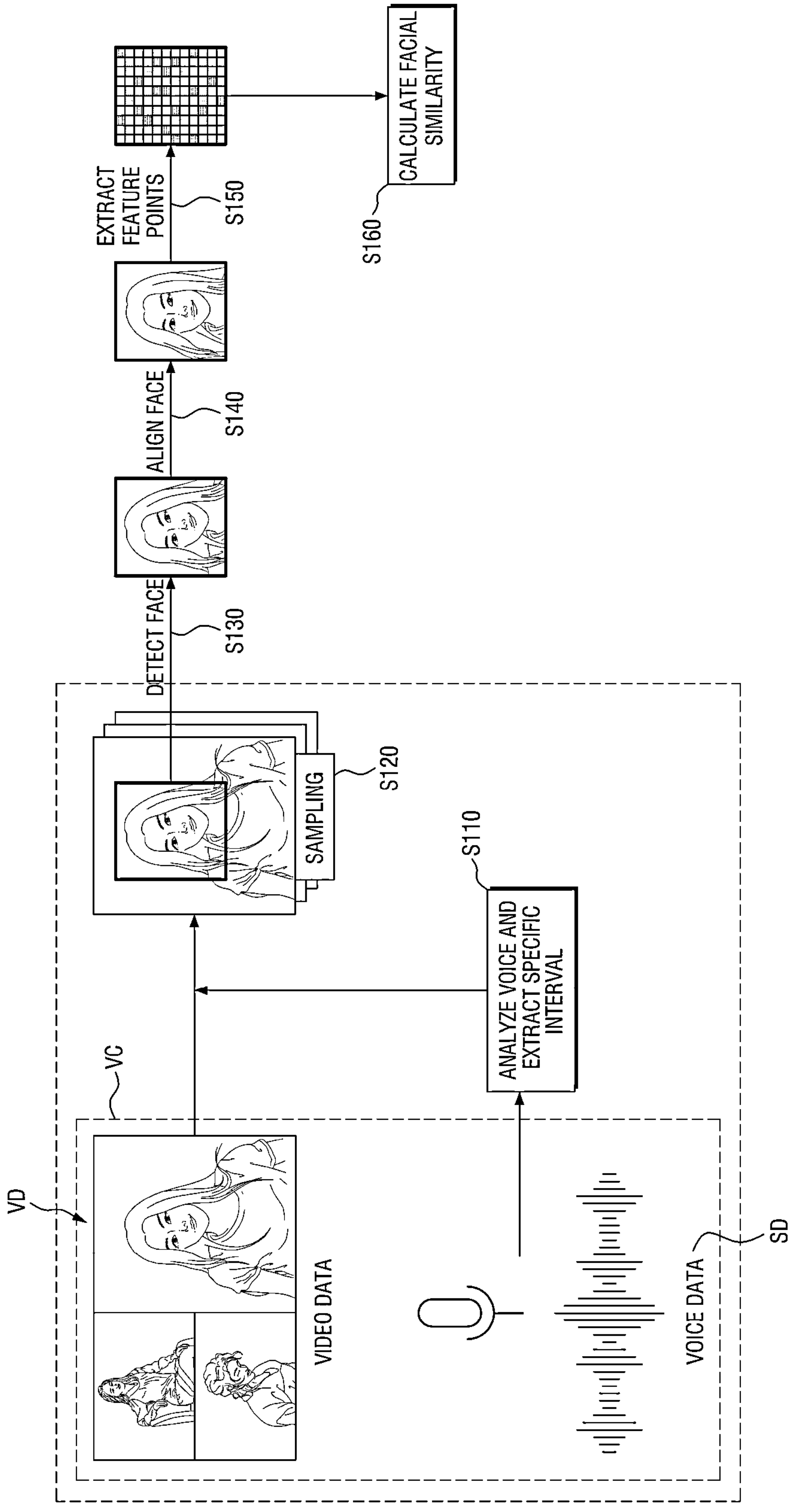

[FIG. 3]
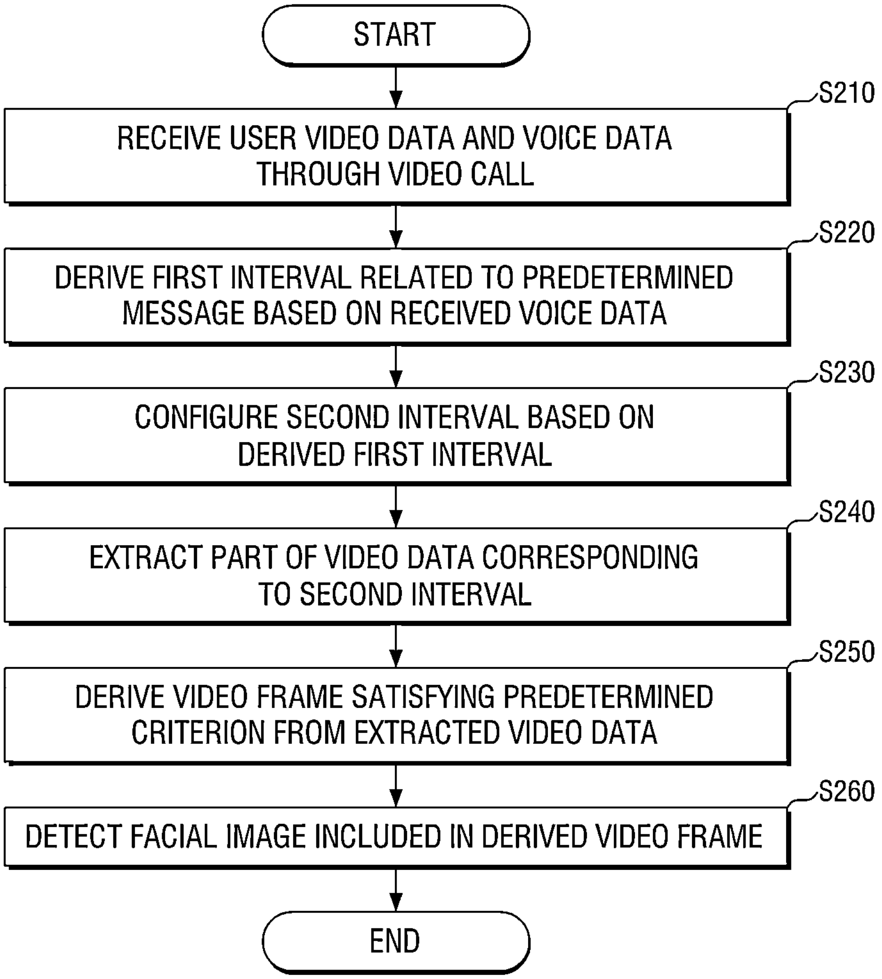

[FIG. 4]
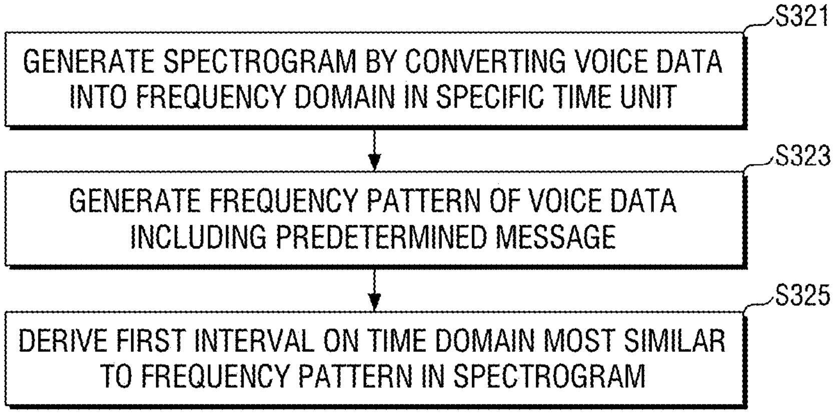
[FIG. 5]
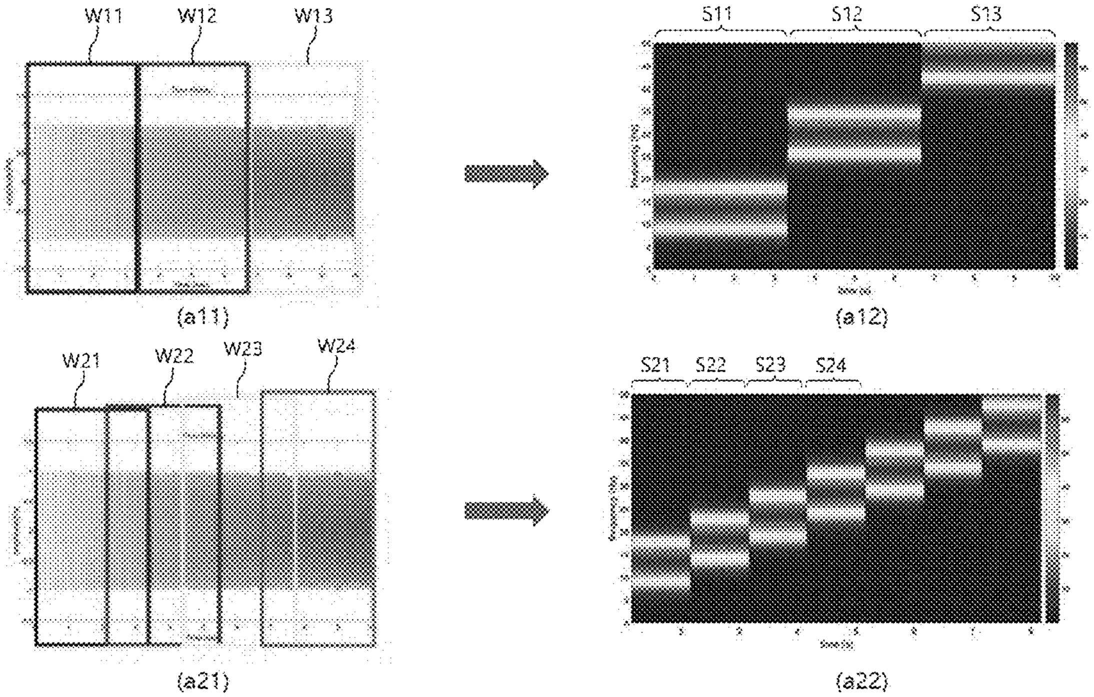

[FIG. 6]
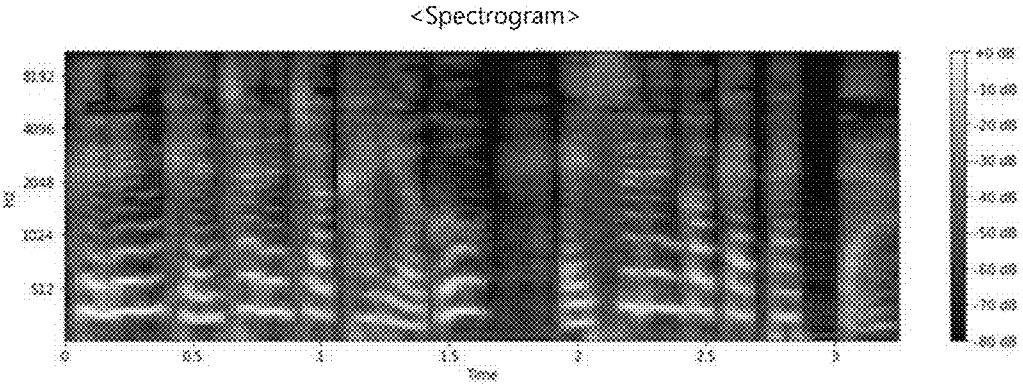
[FIG. 7]
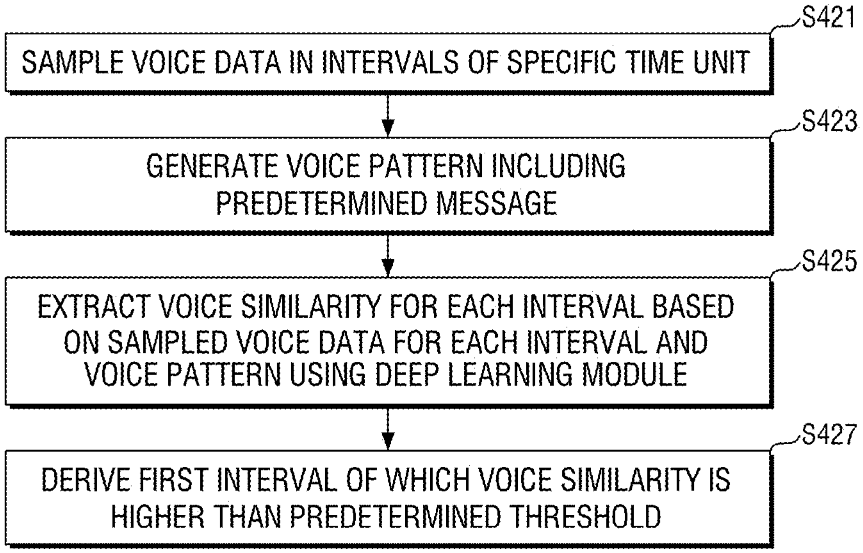

[FIG. 8]
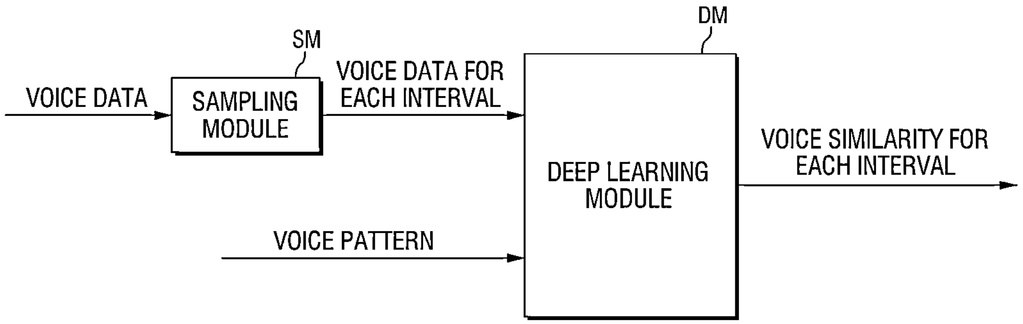
[FIG. 9]
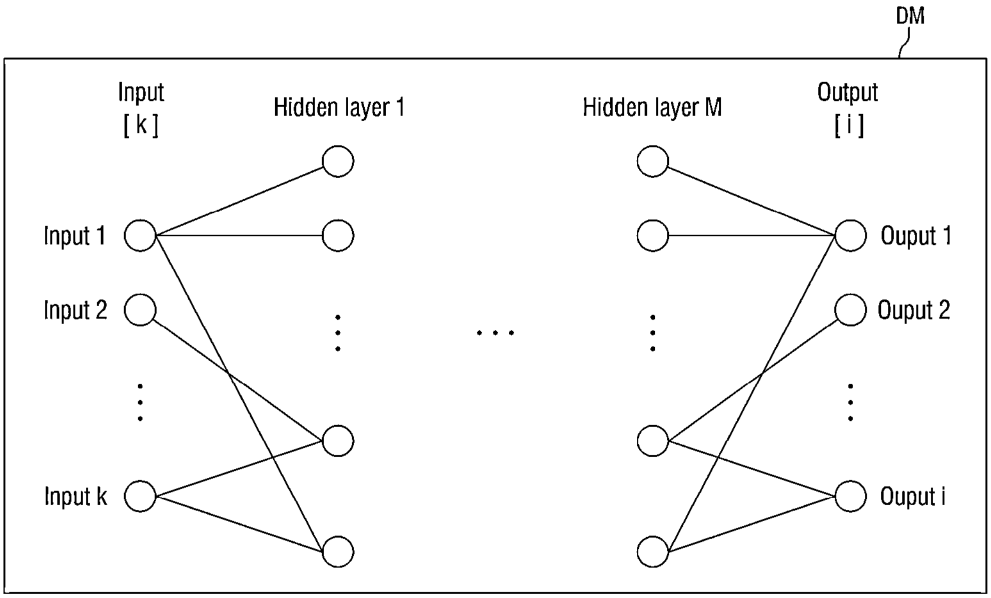

[FIG. 10]
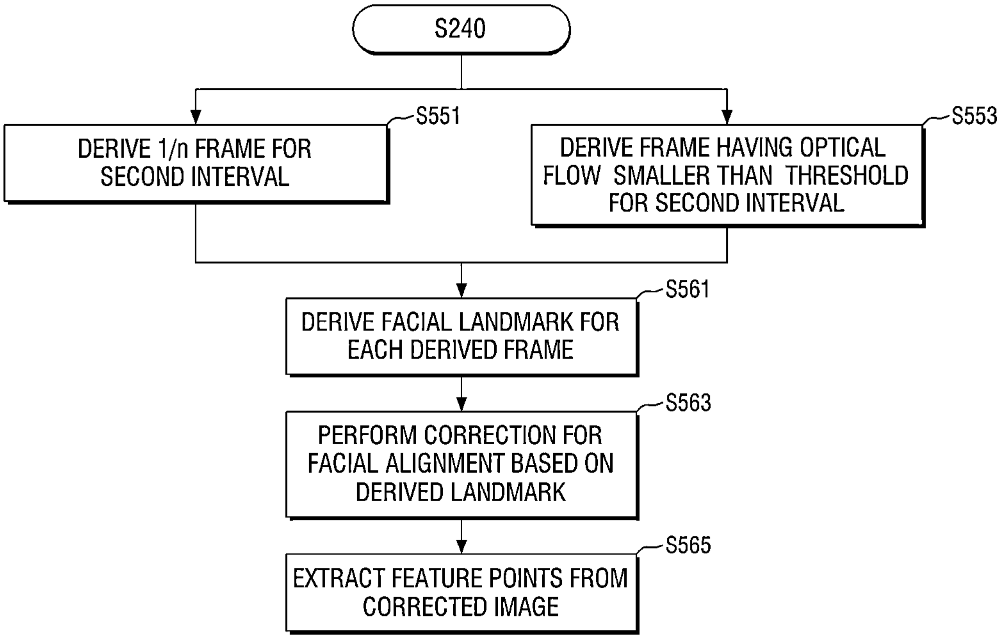

[FIG. 11]
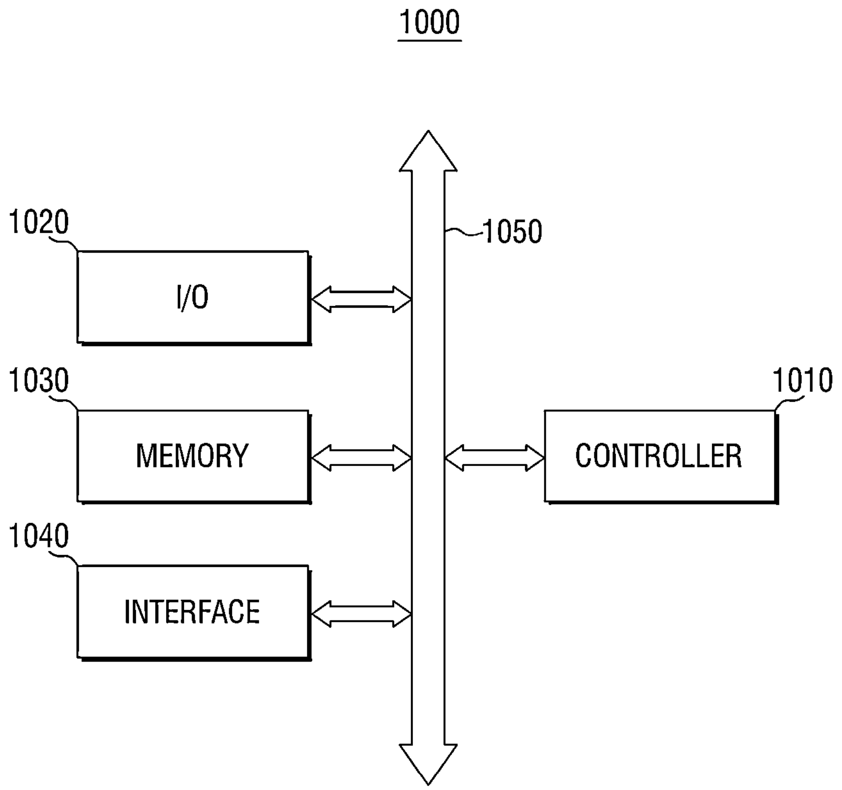

FACE DETECTION METHOD USING VOICE

TECHNICAL FIELD

The disclosure relates to face detection methods using voice. Specifically, the disclosure relates to methods of deriving an interval related to a predetermined message based on received voice data and detecting a facial image from a video frame of video data extracted based on the derived interval.

BACKGROUND ART

The contents described in this part merely provide background information about the embodiment and do not constitute the prior art.

Recently, due to the development of smart devices and networks and the development of various network services, various tasks including banking that have been performed face-to-face have been converted to online/wireless non-face-to-face business processing. At this time, when user authentication is required during non-face-to-face business processing, a face detection method of extracting a user's face from a user's real-time video and comparing the extracted user's face with a previously registered user's picture is widely used.

A conventional face detection method takes a method of performing decoding on the entire recorded image and searching for a specific frame in which the optimal face pose exists for all frames of the decoded recorded image. Therefore, face detection has required considerable time and resources.

In addition, other conventional face detection methods have a problem that resources used for face detection are rapidly increased by extracting all frames of the recorded image and executing a face detection algorithm on all the extracted frames.

Therefore, there is a need for a face detection method capable of obtaining the same effect by using less time and fewer resources.

DISCLOSURE

Technical Problem

One aspect of the disclosure provides a method of deriving an interval related to a predetermined message by using voice data converted into frequency domain, deriving a video frame which satisfies a predetermined criterion from video data corresponding to the derived interval, and detecting a facial image from the derived video frame.

Another aspect of the disclosure provides a method of deriving an interval of voice data most relevant to a predetermined message using a pre-trained deep learning module, deriving a video frame which satisfies a predetermined criterion from video data corresponding to the derived interval, and detecting a facial image from the derived video frame.

Aspects of the disclosure are not limited to those described above, and other objects and advantages of the disclosure not described above can be understood by the following description and will be more clearly understood by embodiments of the disclosure. In addition, it will be readily apparent that the objects and advantages of the disclosure may be realized by means indicated in the claims and combinations thereof.

Technical Solution

According to one aspect of the disclosure, a face detection method, which is performed by a server associated with a user terminal, includes receiving video data and voice data from the user terminal, deriving a first interval related to a predetermined message based on the received voice data, configuring a second interval based on the derived first interval, extracting a part of the video data corresponding to the second interval, deriving at least one video frame which satisfies a predetermined criterion, from the extracted video data, and detecting a facial image included in each of the at least one derived video frame.

Also, the deriving the first interval may include generating a spectrogram by converting the voice data into frequency domain in a predetermined time unit, generating a frequency pattern of the voice data including the predetermined message, and selecting an interval having a highest similarity to the frequency pattern in the spectrogram as the first interval.

Also, the generating the spectrogram may include generating a first spectrum by converting first voice data corresponding to a first window configured in the predetermined time unit into frequency domain, generating a second spectrum by converting second voice data corresponding to a second window, which is different from the first window and configured in the predetermined time unit, into frequency domain, and generating the spectrogram by merging the first spectrum and the second spectrum.

Also, the first window and the second window may partially overlap each other on time domain of the voice data.

Also, the deriving the first interval may include sampling the voice data in intervals of a predetermined time unit, generating a voice pattern including a predetermined message, extracting voice similarity for each interval based on the sampled voice data for each interval and the voice pattern using a deep learning module, and selecting an interval in which the voice similarity is higher than a predetermined threshold as the first interval.

Also, the deep learning module may include an input layer including the sampled voice data for each interval and the voice pattern as input nodes, an output layer including the voice similarity as an output node, and one or more hidden layers disposed between the input layer and the output layer, wherein weights of nodes and edges between the input node and the output node are updated by learning processes of the deep learning module.

Also, the second interval may be located after the first interval in time series within the voice data.

Also, a part of the second interval may overlap a part of the first interval.

Also, the deriving the video frame may include deriving one or more frames for the second interval by using a predetermined period, or deriving a frame in which an optical flow is smaller than a threshold in the second interval.

Also, the detecting the facial image may include deriving facial landmarks for each of the at least one derived video frame, performing correction for facial alignment based on the derived facial landmarks, and extracting feature points from the corrected facial image.

According to another aspect of the disclosure, a face detection method, which is performed by a server associated with a user terminal, includes receiving video data and voice data from the user terminal, deriving an interval related to a predetermined message based on the received voice data, extracting a part of the video data within a predetermined range based on the derived interval, deriving a video frame which satisfies a predetermined criterion from the extracted video data and detecting a facial image included in the derived video frame.

Also, the deriving the interval may include generating a spectrogram by converting the voice data into frequency domain in a predetermined time unit, generating a frequency pattern of the voice data including the predetermined message, selecting an interval having a highest similarity to the frequency pattern in the spectrogram as the interval.

In addition, the first user may be a person in charge of the original mail, and the second user may be a manager of the person in charge.

Also, the deriving the interval may include: sampling the voice data in intervals of a predetermined time unit, generating a voice pattern including a predetermined message, extracting voice similarity for each interval based on the sampled voice data for each interval and the voice pattern using a deep learning module, and selecting an interval in which the voice similarity is higher than a predetermined threshold as the interval.

Advantageous Effects

A face detection method of the disclosure may quickly search for optimal facial images aligned in the front by deriving an interval related to a predetermined message by using voice data converted into frequency domain and detecting a facial image within a frame included in video data corresponding to the derived interval. Accordingly, the disclosure may shorten the time required for face detection to improve a user face detection speed and may reduce loads applied to a system.

In addition, the face detection method of the disclosure may quickly search for optimal facial image aligned in the front by deriving an interval of voice data most relevant to a predetermined message using a pre-trained deep learning module and detecting the optimal facial image aligned in the front within a frame included in video data corresponding to the derived interval. Accordingly, the disclosure may increase the accuracy of face detection and reduce the time and resources required for face detection.

In addition to the above description, specific effects of the disclosure will be described together while explaining specific details for carrying out the disclosure.

DESCRIPTION OF DRAWINGS

FIG. 1 is a conceptual diagram illustrating a system for performing a face detection method according to some embodiments of the disclosure.

FIG. 2 is a diagram for describing a process of calculating facial similarity on the basis of a face detection method according to some embodiments of the disclosure.

FIG. 3 is a flowchart for describing a face detection method according to some embodiments of the disclosure.

FIG. 4 is a flowchart for describing an example of a method of deriving a first interval according to step S220 of FIG. 3.

FIG. 5 is a diagram for describing some examples of generating a spectrogram in step S321 of FIG. 4.

FIG. 6 is a diagram for describing a spectrogram generated through the face detection method of FIG. 4.

FIG. 7 is a diagram for describing another example of a method of deriving a first interval according to step S220 of FIG. 3.

FIG. 8 is a block diagram for schematically describing a deep learning module used in the face detection method of FIG. 7.

FIG. 9 is a diagram illustrating the configuration of the deep learning module of FIG. 8.

FIG. 10 is a flowchart for describing some examples of steps S250 and S260 of FIG. 3.

FIG. 11 is a diagram for describing hardware implementation of a system for performing a face detection method according to some embodiments of the disclosure.

MODE FOR CARRYING OUT THE INVENTION

The terms or words used in the specification and the claims should not be construed as being limited to ordinary or dictionary meanings. The terms or words should be construed as meanings and concepts consistent with the technical idea of the disclosure, based on the principle that the inventors can appropriately define the concept of the terms in order to explain their disclosure in the best way. The configuration shown in the embodiments and drawings described in the specification is only the most preferred embodiment of the disclosure, and does not represent all the technical idea of the disclosure. Therefore, it should be understood that various equivalents and modifications may be substituted for them at the time of filing the application.

It will be understood that although the terms "first," "second," etc. used in the specification and the claims may be used herein to describe various elements, these elements should not be limited by these terms. These terms are only used to distinguish one element from another. For example, while not departing from the scope of the disclosure, a first element may be referred to as a second element, and similarly, a second element may be referred to as a first element. The term "and/or" includes a combination of a plurality of related recited items or any one of a plurality of related recited items.

The terms as used in the specification and the claims are only used to describe specific embodiments, and are not intended to limit the disclosure. The singular forms as used herein are intended to include the plural forms as well unless the context clearly indicates otherwise. It will be understood that the terms "comprise," "include," and "have" as used herein do not preclude the presence or addition of one or more other features, integers, steps, operations, elements, components, or combinations thereof.

Unless defined otherwise, all terms including technical or scientific terms as used herein have the same meaning as commonly understood by those of ordinary skill in the art.

It will be understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the respective configurations, steps, processes, or methods included in the respective embodiments of the disclosure may be shared within a range that does not contradict each other technically.

Hereinafter, a face detection method and a system for performing the same, according to embodiments of the disclosure, will be described in detail with reference to FIGS. 1 to 11.

FIG. 1 is a conceptual diagram illustrating a system for performing a face detection method according to some embodiments of the disclosure.

Referring to FIG. 1, a system according to an embodiment of the disclosure includes a financial company server 100, a user terminal 200, and a counselor terminal 300.

The financial company server 100 (hereinafter referred to as a server) may mediate a video call between the user terminal 200 and the counselor terminal 300, and may perform user identification or authentication by using video call data. In this case, the server 100 may extract a user's facial image from the video call by using a face detection method, and may perform user identification or authentication by using the extracted facial image.

However, the face detection method performed by the server 100 is not limited to the above-described operation, and it is obvious that the face detection method can be applied and performed in various embodiments. Hereinafter, for convenience of explanation, an example of performing user authentication in a video call will be described.

The server 100 may operate as an entity that performs the face detection method. Specifically, the server 100 may receive video call data from the user terminal 200. In this case, the video call data may include voice data obtained by recording a user's voice and video data obtained by photographing the user's face.

Subsequently, the server 100 may derive a specific interval (hereinafter, a first interval) related to a predetermined message on the basis of the received voice data.

At this time, the server 100 may derive a voice data interval similar to a voice pattern including a predetermined message by using a deep learning module or a spectrogram generated through a process of converting the user's voice data into frequency domain.

Here, the spectrogram is a tool for visualizing and identifying sound or waves, and means a graph in which characteristics of a waveform and a spectrum are combined. In the waveform graph, the change of the amplitude according to the change of the time appears. In the spectrum, the change of the amplitude according to the change of the frequency appears. However, in the spectrogram, the difference in amplitude according to the change of the time and the frequency appears as the difference in print density or display color.

In an embodiment of the disclosure, the server 100 may derive the first interval by using the spectrogram of the voice data.

Specifically, the server 100 generates a spectrogram by converting the voice data into the frequency domain in a predetermined time unit. Subsequently, the server 100 generates a frequency pattern of voice data including a predetermined message (e.g., "Please face the front of the camera").

Subsequently, the server 100 may configure an interval in the spectrogram most similar to the generated frequency pattern as the first interval. In this case, the first interval may be configured on the basis of the time axis. The process of deriving the voice data interval using the spectrogram will be described in detail with reference to FIGS. 4 to 6.

In addition, according to another embodiment of the disclosure, the server 100 may derive the first interval using a pre-trained deep learning module.

Specifically, the server 100 samples the voice data in intervals of a predetermined time unit. Subsequently, the server 100 may generate a voice pattern including a predetermined message (e.g., "Please face the front of the camera"). Subsequently, the server 100 may calculate voice similarity for each interval by comparing the generated voice pattern with the voice data sampled using the pre-trained deep learning module. At this time, the algorithm for calculating the voice similarity may be variously modified and used. Since a detailed description of the corresponding algorithm is widely known to those of ordinary skill in the art, the detailed description thereof is omitted.

Subsequently, the server 100 may select an interval having a similarity higher than a predetermined threshold as the first interval. The process of deriving the voice data interval using the deep learning module will be described below with reference to FIGS. 7 to 9.

Subsequently, the server 100 may derive a second interval on the basis of the derived first interval. At this time, the second interval may be disposed at a different location from the first interval, and a relative location may be set differently according to the type of the predetermined message.

For example, when the second interval is derived on the basis of a predetermined message "Please face the front of the camera", the second interval may be located after the first interval in time series (i.e., at a lower priority) within the voice data.

As another example, when the second interval is derived on the basis of a predetermined message "Face examination has been completed", the second interval may be located ahead of the first interval in time series within the voice data.

Subsequently, the server 100 may extract a part of the video data on the basis of the derived internal (the interval related to the predetermined message, that is, the second interval) and may derive a video frame included in the extracted video data.

In this case, the server 100 may derive the video frame for the derived interval in various methods.

For example, the server 100 may derive the video frame at regular time intervals (e.g., 1/n frame intervals). As another example, the server 100 may derive a frame in the derived interval of which the optical flow is less than a threshold. Here, the optical flow refers to a vector representing the apparent motion appearing in the video from two temporally different video data captured and inputted by a camera. However, these are only several examples of deriving the video frame, and the disclosure can derive the video frame through various methods. Subsequently, the server 100 may detect the facial image from the derived video frame. The method of deriving the video frame and detecting the facial image will be described in detail with reference to FIG. 10.

Subsequently, the server 100 may perform a user identification or authentication procedure by using the derived facial image.

In the disclosure, the server 100 and the user terminal 200 may be implemented as a server-client system. Specifically, the server 100 may classify, store, and manage voice data, video data, and a previously inputted facial image (e.g., an identity (ID) card image or a facial image detected in the past) for each user account, and may provide various services related to provision of financial information and video call through a terminal application installed on the user terminal 200.

In this case, the terminal application may be a dedicated application for receiving voice data and video data or a web browsing application. Here, the dedicated application may be an application embedded in the user terminal 200 or an application downloaded from an application distribution server and installed on the user terminal 200.

The user terminal 200 refers to a communication terminal capable of operating an application in a wired/wireless communication environment. Although FIG. 1 illustrates that the user terminal 200 is a smart phone, which is a type of portable terminal, the disclosure is not limited thereto. As described above, the user terminal 200 may be applied without limitation to a device capable of operating a financial application. For example, the user terminal 200 may include various types of electronic devices, such as a personal computer (PC), a laptop computer, a tablet computer, a mobile phone, a smart phone, or a wearable device (e.g., a watch-type terminal).

In addition, although only one user terminal 200 is illustrated in the drawing, the disclosure is not limited thereto, and the server 100 may operate in association with a plurality of user terminals 200.

Additionally, the user terminal 200 may include an input unit for receiving a user's input, a display unit for displaying visual information, a communication unit for transmitting and receiving signals to and from the outside, a camera unit for photographing a user's face, a microphone unit for converting a user's voice into digital data, and a control unit for processing data, controlling each unit inside the user terminal 200, and controlling data transmission/reception between units. Hereinafter, commands executed by the control unit in the user terminal 200 according to a user's command are collectively referred to as being executed by the user terminal 200.

On the other hand, the counselor terminal 300 may operate in association with the server 100 and may be a counterpart that performs a video call with the user terminal 200. Although not clearly illustrated in the drawings, the server 100 may operate in association with a plurality of counselor terminals 300. When a video call request is received from the user terminal 200, the server 100 may select one of the plurality of counselor terminals 300 and match the selected counselor terminal 300 with the user terminal 200 requesting the video call.

The server 100 may perform relay so that a video call may be performed between the matched user terminal 200 and the counselor terminal 300 mutually. In this case, the server 100 may store and manage a history of video calls between the user terminal 200 and the counselor terminal 300.

On the other hand, the communication network 400 serves to connect the server 100, the user terminal 200, and the counselor terminal 300 to one another. That is, the communication network 400 refers to a communication network that provides an access path so that the user terminal 200 or the counselor terminal 300 can transmit and receive data after accessing the server 100. The communication network 400 may include, for example, wired networks such as Local Area Networks (LANs), Wide Area Networks (WANs), Metropolitan Area Networks (MANs), or Integrated Service Digital Networks (ISDNs), or wireless networks such as wireless LANs, CDMA, Bluetooth or satellite communications, but the scope of the disclosure is not limited thereto.

Hereinafter, a face detection method performed by a system according to an embodiment of the disclosure will be described in detail.

FIG. 2 is a diagram for describing a process of calculating facial similarity on the basis of a face detection method according to some embodiments of the disclosure.

Referring to FIG. 2, the server 100 may analyze a user's voice using voice data SD of video call data VC received from the user terminal 200, and may extract a specific interval corresponding to a part of video data VD at S110.

Specifically, the server 100 may receive, in real time, the video call data VC including the video data VD and the voice data SD from the user terminal 200 through which a video call is in progress. The server 100 may analyze the received voice data SD to derive an interval related to a predetermined message (e.g., "Please face the front of the camera" or "Face photographing has been completed").

At this time, the server 100 may derive the interval related to the predetermined message using a spectrogram or a deep learning module. Details thereof will be described with reference to FIGS. 4 to 6 and FIGS. 7 to 9.

Subsequently, the server 100 extracts a specific frame through sampling from the video data VD corresponding to the specific interval of the extracted voice data SD at S120.

Here, the server 100 may extract a partial interval of the video data VD within a predetermined range on the basis of the derived specific interval. The server 100 may derive several video frames which satisfy a predetermined criterion from the extracted video data VD.

For example, the server 100 may sample frames of the extracted video data VD at regular time intervals or derive and sample video frames having an optical flow smaller than a threshold.

As another example, the server 100 may operate a pose detection algorithm on the extracted video data VD. When a predetermined pose is detected by the pose detection algorithm, the server 100 may terminate the pose detection algorithm and extract at least one video frame related to the detected pose.

However, these are only some examples of deriving the video frame, and the disclosure is not limited thereto.

Subsequently, the server 100 detects the user's face from the extracted video frame at S130. The server 100 may detect the user's face by using a pre-trained deep learning model (e.g., Multi-Task Cascaded Convolutional Neural Networks (MTCNN), Retinaface, or Blazeface). The user's face may be detected using a bounding box within the video frame. At this time, the deep learning model used in the server 100 may be variously modified and used.

Subsequently, the server 100 aligns the extracted user's face at S140.

Specifically, the server 100 may detect a facial landmark for the extracted face. In this case, the facial landmark refers to a part constituting facial features such as eyes, a nose, a mouth, a jawline, and a bridge of the nose. Subsequently, the server 100 may align the face on the basis of the detected facial landmark. For example, the server 100 may use a method of forming a straight line between eyes, measuring an angle between the straight line and a horizontal line, and rotating the facial image by an opposite angle. However, this is only one example and the disclosure is not limited thereto.

Subsequently, the server 100 extracts feature points of the aligned face at S150.

Subsequently, the server 100 calculates the similarity of the face by using the extracted feature points of the face at S160. In this case, the server 100 may express the extracted feature points of the face as a real vector, and may calculate the facial similarity through the process of performing comparison with the feature points extracted from the ID card image of the user stored in advance. The calculated facial similarity may be used to determine the identity of the user's face.

Hereinafter, the process of deriving the first interval and the second interval in the face detection method according to some embodiments of the disclosure will be described in detail.

FIG. 3 is a flowchart for describing a face detection method according to some embodiments of the disclosure.

Referring to FIG. 3, the server 100 receives video data and voice data through a video call at S210).

Subsequently, the server 100 derives a first interval related to a predetermined message on the basis of the received voice data at S220.

For example, the server 100 may configure an interval in which a predetermined message "Please face the front of the camera" is outputted as the first interval in the received voice data. In this case, the server 100 may derive the first interval related to the predetermined message using a spectrogram obtained by converting voice data into frequency domain or a pre-trained deep learning module.

Subsequently, the server 100 configures a second interval on the basis of the derived first interval at S230.

For example, the server 100 may configure an interval for about 10 seconds from the end point of the derived first interval as the second interval, or an interval from the end of the first interval to a part containing a message "Face photographing has been completed" as the second interval. However, this is only an example and the disclosure is not limited thereto.

Here, as a matter of course, the second interval may be located after the first interval in time series within the voice data, and a part of the second interval may overlap a part of the first interval.

Next, the server 100 extracts a part of the video data corresponding to the second interval at S240.

Subsequently, the server 100 derives at least one video frame which satisfies a predetermined criterion, from the extracted video data at S250. In this case, the server 100 may derive at least one video frame for video data at predetermined time intervals (e.g., 1/n) or may derive at least one video frame using an optical flow.

Subsequently, the server 100 detects a facial image included in the derived video frame at S260. At this time, the server 100 may detect the user's face using a pre-trained deep learning model (e.g., MTCNN, Retinaface, or Blazeface), and the user's face may be detected using a bounding box within a video frame. However, the disclosure is not limited thereto, and the deep learning model used in the server 100 may be variously modified and used.

Hereinafter, a face detection method for deriving a first interval by using a spectrogram according to an embodiment of the disclosure will be described.

FIG. 4 is a flowchart for describing an example of a method of deriving a first interval according to step S220 of FIG. 3.

Referring to FIG. 4, after step S210, the server 100 generates a spectrogram by converting voice data into frequency domain in a specific time unit at S321.

Specifically, the server 100 may divide the voice data received from the user terminal 200 on the basis of a predetermined time unit. Subsequently, the server 100 may generate a plurality of spectra by converting each of the divided voice data into frequency domain, and may generate a spectrogram by merging the plurality of spectra in time order.

Subsequently, the server 100 generates a frequency pattern of voice data including a predetermined message (e.g., "Please face the front of the camera") at S323. At this time, the server 100 may generate a frequency pattern corresponding to the predetermined message by converting a sample of the voice data including the predetermined message.

Subsequently, the server 100 compares the spectrogram generated in step S321 with the frequency pattern generated in step S323, and derives a first interval on the time domain most similar to the frequency pattern at S325.

At this time, the server 100 may derive a similarity with the frequency pattern for each predetermined time unit in the spectrogram. Subsequently, the server 100 may select an interval having the highest similarity to the frequency pattern in the spectrogram as the first interval.

FIG. 5 is a diagram for describing some examples of generating a spectrogram in step S321 of FIG. 4.

Referring to FIG. 5, all represents voice data divided into windows of predetermined time unit, and a12 represents a spectrogram generated by connecting the spectrum converting the voice data divided in all into the frequency domain in time series.

In this case, the server 100 may transform the voice data into the frequency domain using Short Time Fourier Transform (STFT). Here, the STFT is a method of dividing data into short time intervals, performing a Fourier transform on the data of the divided intervals to make an image of a frequency distribution according to unit time.

Specifically, the server 100 may divide the voice data received from the user terminal 200 into a predetermined time unit. Hereinafter, for convenience of explanation, it will be assumed that the predetermined time unit is 3.3 seconds.

For example, referring to all, the server 100 may divide 10-second voice data into 3.3-second unit. At this time, the server 100 may configure an interval corresponding to 0-3.3 seconds of the voice data as a first window W11, and may configure an interval corresponding to 3.4-6.6 seconds as a second window W12. In addition, the server 100 may configure an interval corresponding to 6.8-10 seconds as a third window W13. Here, a window length is the predetermined time unit. That is, the window length of the first to third windows W11 to W13 may be 3.3 seconds.

Next, the server 100 may generate each spectrum by converting the first to third windows W11 to W13 into frequency domain. Specifically, the server 100 may generate a first spectrum S11 by converting the first voice data corresponding to the first window W11 into frequency domain. Subsequently, the server 100 may generate a second spectrum S12 by converting the second voice data of the second window W12, and may generate a third spectrum S13 by converting the third voice data of the third window W13.

Subsequently, the server 100 may generate a spectrogram a12 of the voice data by merging the generated first to third spectra S11 to S13 in time series.

On the other hand, the server 100 may perform STFT analysis by applying an overlapped window to voice data. At this time, the plurality of windows may overlap each other on the time domain of the voice data, and the overlapping length may be set in advance or may be specified as a window ratio.

For example, referring to a21, the server 100 may divide 10-second voice data into 3.3-second unit. The server 100 may configure an interval corresponding to 0-3.3 seconds of the voice data as a first window W21.

Subsequently, the server 100 may configure a second window W22 overlapping the first window W21. At this time, the second window W22 may be located in an interval corresponding to 2.2-5.5 seconds.

In addition, the server 100 may configure a third window S23 overlapping the second window W22 and a fourth window W24 overlapping the third window W23.

Subsequently, the server 100 may generate spectra S21 to S24 by converting the first to fourth windows W21 to W24 into frequency domain.

Subsequently, the server 100 may generate a spectrogram a22 of the voice data by merging the plurality of generated spectra S21 to S24 in time series.

In this case, each spectrum may be arranged in the remaining intervals other than the time interval overlapping the window disposed on one side. For example, the unit time of the first window W21 is 0-3.3 seconds, but the converted first spectrum S21 may be located at a position corresponding to 0-2.2 seconds, from which an interval overlapping the second window W22 located on one side is subtracted.

In addition, referring to the generated spectrogram a22, it can be confirmed that each spectrum partially overlaps the frequency domain of the spectra located on both sides.

By using windows overlapping on the time domain, the disclosure can derive the first interval in more detail, thereby improving accuracy in deriving an interval matching a predetermined message.

FIG. 6 is a diagram for describing a spectrogram generated through the face detection method of FIG. 4.

Referring to FIG. 6, the server 100 may generate a spectrogram for voice data received from the user terminal 200 through the process of FIG. 5 described above.

The server 100 may derive, from the generated spectrogram, an interval having the highest similarity with a frequency pattern related to voice data including a predetermined message. For example, the server 100 may divide the spectrogram into predetermined interval and calculate a similarity between the frequency pattern and the spectrum for each divided interval.

Subsequently, the server 100 may select an interval in which the spectrum having the highest calculated similarity is included as the first interval.

Additionally, the server 100 may derive the first interval using a log mel spectrogram or LibROSA. However, this is only an example, and various algorithms for deriving the first interval may be used.

Hereinafter, a face detection method for deriving a first interval using a deep learning module according to another embodiment of the disclosure will be described.

FIG. 7 is a diagram for describing another example of a method of deriving a first interval according to step S220 of FIG. 3.

Referring to FIG. 7, the server 100 samples voice data in intervals of a specific time unit S421. Specifically, the server 100 may input voice data received from the user terminal 200 to a sampling module. The sampling module may divide and output voice data for each interval in a predetermined specific time unit on the basis of the input voice data.

Subsequently, the server 100 generates a voice pattern including a predetermined message at S423. The server 100 may configure a part of voice data including a predetermined message (e.g., "Please face the front of the camera") as a voice pattern.

Subsequently, the server 100 extracts voice similarity for each interval on the basis of the sampled voice data for each interval and voice pattern using the deep learning module at S425. At this time, the sampled voice data for each interval and voice pattern may be inputted to input nodes of the deep learning module, and voice similarity may be outputted to an output node.

Subsequently, the server 100 configures the first interval by deriving an interval in which the voice similarity outputted from the deep learning module is higher than a predetermined threshold at S427. At this time, the server 100 may derive an interval having the highest voice similarity among intervals having a voice similarity higher than the predetermined threshold as the first interval.

FIG. 8 is a block diagram for schematically describing a deep learning module used in the face detection method of FIG. 7.

Specifically, referring to FIG. 8, a deep learning module DM receives voice data for each interval and voice pattern and outputs voice similarity for each interval as an output thereof.

At this time, voice data for each interval may be generated by the sampling module SM. The sampling module SM may sample the voice data received from the user terminal 200 so as to be divided into preset intervals. Voice data for each interval outputted through the sampling module SM may be inputted to the deep learning module DM. In addition, the voice pattern refers to voice data including a predetermined message (e.g., "Please face the front of the camera").

The deep learning module DM may derive the similarity of voice data for each interval (i.e., voice similarity for each interval) with respect to the voice pattern using the artificial neural network trained on the basis of big data.

The deep learning module DM may perform artificial neural network learning using mapping data for separate parameters derived on the basis of input data. The deep learning module DM may perform machine learning on parameters inputted as learning factors. In this case, a memory of the server 100 may store data used for machine learning and result data.

In more detail, deep learning technology, which is a type of machine learning, learns down to a deep level in multiple stages on the basis of data.

Deep learning represents a set of machine learning algorithms that extract core data from a plurality of data while stepping up.

The deep learning module DM may use various known deep learning structures. For example, the deep learning module DM may use a structure such as a convolutional neural network (CNN), a recurrent neural network (RNN), a deep belief network (DBN), or a graph neural network (GNN).

Specifically, the CNN is a model that simulates a human brain function on the assumption that when a person recognizes an object, the basic features of the object are extracted, and then, the object is recognized on the basis of the result of complex calculation in the brain.

The RNN is widely used in natural language processing, etc., and is an effective structure for processing time-series data that changes over time. The RNN can construct an artificial neural network structure by stacking up layers at each moment.

The DBN is a deep learning structure including multiple layers of Restricted Boltzmann Machine (RBM), which is a deep learning technique. When a certain number of layers is obtained by repeating RBM learning, the DBN having a corresponding number of layers may be configured.

The GNN represents an artificial neural network structure implemented in a method of deriving similarities and feature points between modeling data using modeling data modeled on the basis of data mapped between specific parameters.

On the other hand, the artificial neural network learning of the deep learning module DM may be performed by adjusting weights of connection lines between nodes (and adjusting bias values if necessary) so that a desired output is produced for a given input. In addition, the artificial neural network may continuously update weight values by learning. In addition, a method such as back propagation may be used in the artificial neural network learning.

On the other hand, the memory of the server 100 may be mounted with an artificial neural network pre-trained through machine learning.

The deep learning module DM may perform a machine learning-based improvement process recommendation operation using modeling data for the derived parameters as input data. In this case, both semi-supervised learning and supervised learning may be used as machine learning methods of the artificial neural network. In addition, the deep learning module DM may be controlled to automatically update the artificial neural network structure for outputting the voice similarity for each interval after learning according to settings.

Additionally, although not clearly illustrated in the drawings, in another embodiment of the disclosure, the operation of the deep learning module DM may be implemented in the server 100 or a separate cloud server (not illustrated). Hereinafter, the configuration of the deep learning module DM according to the above-described embodiment of the disclosure will be described.

FIG. 9 is a diagram illustrating the configuration of the deep learning module of FIG. 8.

Referring to FIG. 9, the deep learning module DM includes an input layer having voice data for each interval and voice pattern as input nodes, an output layer having voice similarity for each interval as an output node, and M hidden layers disposed between the input layer and the output layer.

Here, a weight may be set to an edge that connects the nodes of the respective layers. The presence or absence of the weight or the edge may be added, removed, or updated in a learning process. Therefore, through the learning process, weights of nodes and edges between k input nodes and i output nodes may be updated.

All nodes and edges may be set to initial values before the deep learning module DM performs learning. However, when information is inputted cumulatively, the weights of the nodes and edges are changed. In this process, matching may be made between parameters inputted as learning factors (i.e., voice data for each interval and voice pattern) and values assigned to the output nodes (i.e., voice similarity for each interval).

Additionally, when using a cloud server (not illustrated), the deep learning module DM may receive and process a large number of parameters. Therefore, the deep learning module DM may perform learning on the basis of massive data.

The weights of the nodes and edges between the input nodes and the output nodes included in the deep learning module DM may be updated by the learning process of the deep learning module DM. In addition, of course, the parameters outputted from the deep learning module DM may be additionally extended to various data other than voice similarity for each interval.

Subsequently, the server 100 may configure a second interval on the basis of the first interval and may extract a part of video data corresponding to the second interval. Since this has been described in detailed, a redundant description thereof is omitted.

Hereinafter, some examples of a method of extracting video frames satisfying a predetermined criterion from extracted video data and detecting a facial image included in the derived video frames will be described.

FIG. 10 is a flowchart for describing some examples of steps S250 and S260 of FIG. 3.

Referring to FIG. 10, in an embodiment of the disclosure, the server 100 may derive video frames at regular time intervals (e.g., 1/n frame intervals) with respect to the video data for the second interval at S551.

In this case, the server 100 may preset a frame derivation period for deriving video frames. For example, when the derivation period is set to 10, the server 100 may derive one video frame for every 10 video frames included in the video data of the second interval. However, this is only a example, and the derivation period of the video frame may be variable or randomly formed.

On the other hand, in another embodiment of the disclosure, the server 100 derives a video frame having an optical flow of the video data smaller than a threshold with respect to the video data for the second interval at S553.

For example, the server 100 may extract a first frame and a second frame from the video data of the second interval, and may extract an optical flow of a vector format on the basis of one or more feature points within each video frame. At this time, the server 100 may calculate the size of the optical flow by calculating the absolute value of the vector. Subsequently, when the calculated size of the optical flow is smaller than a preset threshold, the server 100 may derive a video frame including the corresponding optical flow.

However, this is only several examples of deriving a video frame, and the disclosure is not limited to the above methods.

Subsequently, the server 100 detects a user's facial image from the extracted video frame. The server 100 may detect the user's facial image by using a pre-trained deep learning model (e.g., MTCNN, Retinaface, or Blazeface). The user's facial image may be detected using a bounding box within the video frame. At this time, the deep learning model used in the server 100 may be variously modified and used.

Subsequently, the server 100 derives facial landmarks for each derived video frame at S561. For example, the server 100 may derive eyes, a nose, a mouth, a jawline, or a bridge of the nose from the face displayed in the video frame.

Subsequently, the server 100 performs correction for facial alignment on the basis of the derived landmarks at S563. For example, the server 100 may generate a straight line by connecting a start part of a left eye and a start part of a right eye among the derived landmarks with a line. Subsequently, the server 100 may measure an angle between the generated straight line and a horizontal reference line. The server 100 may align the facial images by rotating the derived facial images at an opposite angle of the same magnitude as the measured angle. However, this is only an example and the disclosure is limited to the above method.

Subsequently, the server 100 extracts feature points from the facial image corrected for face alignment at S565. At this time, since the feature points may be extracted by various algorithms that have already been disclosed, a detailed description thereof is omitted.

Subsequently, the server 100 may calculate facial similarity by comparing feature points extracted from the ID card image of the user with feature points extracted from the corrected facial image. The calculated facial similarity may be used to determine the identity of the user's face.

FIG. 11 is a diagram for describing hardware implementation of a system for performing a face detection method according to some embodiments of the disclosure.

Referring to FIG. 11, the server 100 that performs the face detection method according to some embodiments of the disclosure may be implemented as an electronic device 1000. The electronic device 1000 may include a controller 1010, an input/output (I/O) device 1220, a memory device 1230, an interface 1040, and a bus 1250. The controller 1010, the I/O device 1020, the memory device 1030, and/or the interface 1040 may be coupled with each other through the bus 1050. The bus 1050 corresponds to a path through which data is moved.

Specifically, the controller 1010 may include at least one of a central processing unit (CPU), a microprocessor unit (MPU), a microcontroller unit (MCU), a graphic processing unit (GPU), a microprocessor, a digital signal processor, a microcontroller, an application processor (AP), or logic devices that can perform similar functions thereto.

The I/O device 1020 may include at least one of a keypad, a keyboard, a touch screen, or a display device. The memory device 1030 may store data and/or programs.

The interface 1040 may perform a function of transmitting data to a communication network or receiving data from the communication network. The interface 1040 may be a wired interface or a wireless interface. For example, the interface 1040 may include an antenna or a wired/wireless transceiver. Although not illustrated, the memory device 1030 is an operating memory for improving the operation of the controller 1010 and may further include a high-speed DRAM and/or SRAM. The memory device 1030 may store programs or applications therein.

The user terminal 200 may be applied to a personal digital assistant (PDA), a portable computer, a web tablet, a wireless phone, a mobile phone, a digital music player, a memory card, or any electronic product capable of transmitting and/or receiving information in a wireless environment.

Alternatively, the server 100 and the user terminal 200 according to embodiments of the disclosure may be systems configured by connecting a plurality of electronic devices 1000 to each other through a network. In this case, the respective modules or combinations of the modules may be implemented as the electronic device 1000. However, the embodiment is not limited thereto.

Additionally, the server 100 may be implemented as at least one of a workstation, a data center, an Internet data center (IDC), a direct attached storage (DAS) system, a storage area network (SAN) system, a network attached storage (NAS) system, or a redundant array of inexpensive disks or redundant array of independent disks (RAID) system, but the embodiment is not limited thereto.

In addition, the server 100 may transmit data through a network using by the user terminal 200. The network may include a network based on wired internet technology, wireless internet technology, and short-range communication technology. The wired internet technology may include, for example, at least one of a local area network (LAN) or a wide area network (WAN).

The wireless internet technology may include, for example, at least one of Wireless LAN (WLAN), Digital Living Network Alliance (DMNA), Wireless Broadband (Wibro), World Interoperability for Microwave Access (Wimax), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), or 5G New Radio (NR) technologies. However, the embodiment is not limited thereto.

The short-range communication technology may include, for example, at least one of Bluetooth, Radio Frequency Identification (RFID), Infrared Data Association (IrDA), Ultra-Wideband (UWB), ZigBee, Near Field Communication (NFC), Ultra Voice Communication (USC), Visible Light Communication (VLC), Wi-Fi, Wi-Fi Direct, or 5G NR (New Radio). However, the embodiment is not limited thereto.

The server 100 communicating through the network may comply with technical standards and standard communication schemes for mobile communication. For example, the standard communication schemes may include at least one of Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTEA), or 5G New Radio (NR). However, the embodiment is not limited thereto.

In summary, the face detection methods of the disclosure may derive the interval related to the predetermined message by using the voice data converted into the frequency domain, or may derive the interval of the voice data most relevant to the predetermined message using the pre-trained deep learning module. Subsequently, the disclosure may quickly search for the optimal facial images aligned in the front by detecting the facial images within the frame included in the video data corresponding to the derived interval.

Accordingly, the disclosure may shorten the time required for face detection to improve the user face detection speed, may increase the accuracy of face detection, and may reduce the load applied to the system.

The above description is merely illustrative of the technical spirit of the disclosure, and various modifications and changes can be made by those of ordinary skill in the art, without departing from the scope of the disclosure. Therefore, the embodiments are not intended to limit the technical spirit of the embodiments, but are intended to explain the technical spirit of the embodiments. The scope of the technical spirit of the embodiments is not limited by these embodiments. The scope of the embodiment should be interpreted by the appended claims, and all technical ideas within the scope equivalent thereto should be construed as falling within the scope of the disclosure.

The invention claimed is:

1. A face detection method, which is performed by a server associated with a user terminal, comprising:

receiving video data and voice data from the user terminal;

deriving a first interval related to a predetermined first message based on the received voice data;

configuring a second interval based on the derived first interval, wherein the second interval is located after the first interval in time series within the voice data;

extracting a part of the video data corresponding to the second interval;

deriving a video frame which satisfies a predetermined criterion from the extracted video data based on the second interval; and detecting a facial image included in each of the derived video frame based on the second interval, wherein the predetermined first message comprises a message for guiding a user to align a face toward a front of a camera unit included in the user terminal, wherein a start point of the second interval is set based on an end point of the derived first interval, wherein an end point of the second interval is set to a point where a predetermined second message different from the predetermined first message is outputted, wherein the predetermined first message and the predetermined second message are outputted to the user terminal in a form of the voice data under control of the server, wherein respective output time points of the first message and the second message outputted in the form of the voice data are used in a process of selecting a time boundary in which the facial image is to be detected from the video data, and wherein the extracting the part of the video data comprises detecting the facial image not in the first interval corresponding to the first message, but in the second interval defined from an end point of the first interval to a point where the second message is outputted.

2. The face detection method of claim 1, wherein the deriving the first interval comprises:

generating a spectrogram by converting the voice data into frequency domain in a predetermined time unit;

generating a frequency pattern of the voice data including the predetermined first message; and selecting an interval having a highest similarity to the frequency pattern in the spectrogram as the first interval.

3. The face detection method of claim 2, wherein the generating the spectrogram comprises:

generating a first spectrum by converting first voice data corresponding to a first window configured in the predetermined time unit into frequency domain;

generating a second spectrum by converting second voice data corresponding to a second window, which is different from the first window and configured in the predetermined time unit, into frequency domain; and generating the spectrogram by merging the first spectrum and the second spectrum.

4. The face detection method of claim 3, wherein the first window and the second window partially overlap each other on time domain of the voice data.

5. The face detection method of claim 1, wherein the deriving the first interval comprises:

sampling the voice data in intervals of a predetermined time unit;

generating a voice pattern including the predetermined first message;

extracting voice similarity for each interval based on the sampled voice data for each interval and the voice pattern using a deep learning module; and selecting an interval in which the voice similarity is higher than a predetermined threshold as the first interval.

6. The face detection method of claim 5, wherein the deep learning module comprises:

an input layer including the sampled voice data for each interval and the voice pattern as input nodes;

an output layer including the voice similarity as an output node; and one or more hidden layers disposed between the input layer and the output layer, wherein weights of nodes and edges between the input node and the output node are updated by learning processes of the deep learning module.

7. The face detection method of claim 1, wherein the deriving the video frame comprises deriving one or more frames for the second interval by using a predetermined period, or deriving a frame in which an optical flow is smaller than a threshold in the second interval.

8. The face detection method of claim 1, wherein the detecting the facial image comprises:

deriving facial landmarks for each of the derived video frame;

performing correction for facial alignment based on the derived facial landmarks; and extracting feature points from the corrected facial image.

9. A face detection method, which is performed by a server associated with a user terminal, comprising:

receiving video data and voice data from the user terminal;

deriving an interval related to a predetermined first message based on the received voice data;

extracting a part of the video data within a predetermined range based on the derived interval;

deriving a video frame which satisfies a predetermined criterion from the extracted video data; and detecting a facial image included in the derived video frame, wherein the extracting the part of the video data comprises extracting the part of the video data from video data not in the interval in which the first message is outputted, but in the interval existing from an end point of the interval in which the predetermined first message is outputted to before a point where a predetermined second message different from the predetermined first message is outputted, wherein the predetermined first message comprises a message for guiding a user to align a face toward a front of a camera unit included in the user terminal, wherein the predetermined second message comprises a message for guiding the user that the detection of the facial image has been completed, wherein the predetermined first message and the predetermined second message are outputted to the user terminal in a form of the voice data under control of the server, and wherein respective output time points of the first message and the second message outputted in the form of the voice data are used in a process of selecting a time boundary in which the facial image is to be detected from the video data.

10. The face detection method of claim 9, wherein the deriving the interval comprises:

generating a spectrogram by converting the voice data into frequency domain in a predetermined time unit;

generating a frequency pattern of the voice data including the predetermined first message; and selecting an interval having a highest similarity to the frequency pattern in the spectrogram as the interval.

11. The face detection method of claim 9, wherein the deriving the interval comprises:

sampling the voice data in intervals of a predetermined time unit;

generating a voice pattern including the predetermined first message;

extracting voice similarity for each interval based on the sampled voice data for each interval and the voice pattern using a deep learning module; and selecting an interval in which the voice similarity is higher than a predetermined threshold as the interval.

* * * * *